United States Patent [19]
Packbier et al.

[11] 3,975,472
[45] Aug. 17, 1976

[54] PROCESS AND DEVICE FOR PREPARING PRILLS

[75] Inventors: Mathijs W. Packbier; Kees Jonckers, both of Sittard, Netherlands

[73] Assignee: Stamicarbon B.V., Geleen, Netherlands

[22] Filed: Jan. 29, 1975

[21] Appl. No.: 545,163

[30] Foreign Application Priority Data
Feb. 1, 1974 Netherlands.................... 7401406

[52] U.S. Cl...................................... 264/14; 425/6
[51] Int. Cl.²........................................... B01J 2/04
[58] Field of Search..................... 264/14; 425/6

[56] References Cited
UNITED STATES PATENTS
3,059,280  10/1962  Laehder............................ 264/14
3,836,611  9/1974  Marrovic........................... 264/14

Primary Examiner—Robert F. White
Assistant Examiner—James R. Hall
Attorney, Agent, or Firm—Cushman, Darby & Cushman

[57] ABSTRACT

A method for making granules from sprayed molten material falling through a tower in which a substantial amount of the rising cooling gas stream is withdrawn from the tower at a level below the top of the tower and is discharged to atmosphere. Only the remaining gas stream requires treatment to remove dust and other pollutants, resulting in a considerably lower energy consumption at the same environmental pollution compared with other processes and installations known.

4 Claims, 4 Drawing Figures

PROCESS AND DEVICE FOR PREPARING PRILLS

The invention relates to a process for preparing solid granules from a molten material, in which the molten material is sprayed in the form of drops in the top of a tower in which a rising air current prevails, and the resulting drops cool and set while falling to form solid granules, which cool further during their fall and are discharged from the bottom of the tower. The round granules obtained by the process are usually referred to as "prills".

The rising air is usually sucked through the tower by means of fans and serves to cool the granules. The air leaves the tower at the top and, in dependence on the product which is being processed, may be contaminated by dust, gases or vapours originating from the sprayed liquid. In view of air pollution it is undesirable in some cases to discharge this air as such into the atmosphere. This air may be passed through a purifying installation, but the relatively large drop in pressure in such an installation will require a large fan capacity.

The object of the invention is to obtain a process in which the pollution of the air outside the tower is reduced without requiring an excessive fan capacity.

It has been found that the rising air is loaded with impurities especially in the upper part of the tower, notably in that part of the tower where the sprayed drops, at least on the outside, have not yet solidified. The rising air probably separates extremely fine particles from the drops that have not yet solidified and these particles solidify and are discharged as dust. It is also possible that extremely fine drops form in the spraying process itself, which solidify and are discharged with the air current as dust. If the material to be sprayed is urea, ammonia is moreover released during the solidification.

According to the invention, only part of the total amount of air fed into the bottom of the tower is used in the upper section of the tower in order to solidify at least the outside of the drops during their fall, and this part is passed to a purifying installation. Preferably, the purifying installation is a wet gas scrubber, in which dust and vapours, e.g. ammonia, are wasted from the air to be purified by means of water.

The greater part of the air is discharged from the operative section of the tower at a height at which the air has been contaminated only slightly: hence, it is not necessary to purify this air. The impurities are substantially discharged along with the smaller part of the air flowing out of the top of the tower; only this part is passed through a purifying installation and only this part requires one or more fans with a greater suction capacity. Also the purifying installation may be smaller than would be the case if the entire air current had to be purified.

According to the invention, at least 50 % and at most 80 % of the air fed to the bottom of the tower is discharged from the operative section of the tower at a height ranging between 50 % and 85 % of the operative height of the tower. The "operative section of the tower" denotes the vertical distance from the air feed in the bottom of the tower to the spraying device in the top of the tower. The "upper section" of the tower is that section in which setting of the granules occurs, that is where at least the outside of the granules solidify.

It should be noted that a prilling tower is known from German Patent Specification 932246 (incorporated herein by reference), in which air is drawn off and fresh air is fed in half-way up the tower; this specification nowhere states that the vertical air current in the upper section of the tower should be smaller than that in the lower section of the tower. Furthermore, a prilling tower is known from U.S. Pat. No. 3,071,804 (incorporated herein by reference), in which all air is discharged into the atmosphere at some distance below the top. This vented air stream naturally contains all the impurities the air is loaded with in the tower; no solidification can occur in the upper section of the tower for lack of heat removal.

The invention will be further understood from the following more detailed description of an illustrative embodiment taken with the drawing in which.

Figures 1, 2, 3, 4:
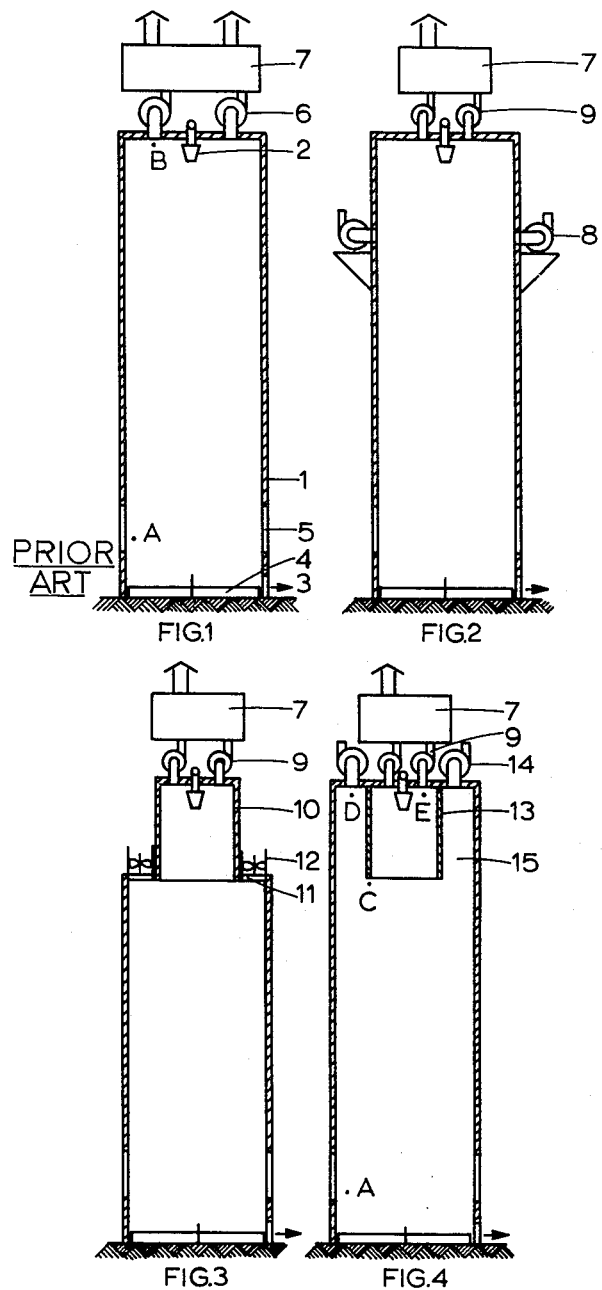
FIG. 1 is a diagrammatic representation of a prilling tower for carrying out a process according to the known state of the art.
FIG. 2 is a diagrammatic representation of an embodiment of a prilling tower for carrying out the process according to the invention.
FIG. 3 is a diagrammatic representation of another embodiment of a prilling tower for carrying out the process according to the invention.
FIG. 4 is a diagrammatic representation of a third embodiment of a prilling tower for carrying out the process according to the invention.

If so desired, the last embodiment may be realized by modification of an existing installation according to FIG. 1.

In the Figures, corresponding parts are indicated by the same reference numbers. The known prilling apparatus shown in FIG. 1 includes a tower 1, in which molten material is sprayed by means of a distributing device 2. The solidified granules are discharged at 3 by means of a conveying device 4. Cooling air enters the tower 1 through openings 5 and is sucked from the tower by fans 6 and vented into the atmosphere by way of a purifying installation 7.

In the FIG. 2 construction the total amount of air drawn off by fans 8 and 9 is fed into the lower section of the tower. The greater part of this air is vented into the atmosphere by the fans 8 at some distance below the top of the tower; this part contains hardly any impurities. The remaining smaller part of the rising air is sucked off by fans 9 at the top of the tower. This air contains virtually all impurities, which are removed from the air in purifying installation 7.

FIG. 3 shows a variant of the embodiment of FIG. 2; the upper section 10 of the tower 1 has been made narrower, while the platform 11 forming the transition from the wider to the narrower part has been equipped with axial fans 12, by means of which the greater part of the suction air is drawn off below the narrower section 10 and vented into the atmosphere. The remaining smaller part of the rising air, in turn, is sucked off by the fans 9 and vented into the atmosphere by way of the purifying installation 7.

FIG. 4 shows an embodiment that is attractive from the viewpoint of construction and is moreover suitable for adapting an existing tower to the new process in a simple way. To this end a cylindrical sheath 13 of substantially smaller diameter than the tower is mounted coaxially in the upper part of the tower. The greater part of the air sucked in is discharged through annular space 15 by means of the fans 14 and a smaller part is vented into the atmosphere by way of the purifying installation 7 by means of fans 9. In this embodiment the lower end of the annular space 15 is the inlet for the fans 14 and therefore the annular space 15 is not part of the upper section of the tower.

A device for carrying out the process, includes a tower in the top of which means are mounted for spraying molten material in drops, means for discharging solidified drops from the tower and means for effecting an upward air current in the tower. According to the invention, the means for effecting the upward air current are so arranged that the greater part of the upward air current is discharged from the operative section of the tower at some distance below the top and a smaller part of the current at the top of the tower by way of a purifying installation for dust and/or gaseous components, the said distance and the said smaller part of the air current being large enough to make the drops of the molten material, at least on the outside, solidify.

The means for discharging the greater part of the air from the tower may consist of one or more fans whose suction openings are arranged in the tower wall at said distance below the top. It is also possible that the upper section of the tower has a smaller cross-section over most of said distance, because the spray of drops of molten material has not yet its largest diameter there.

Use may also be made of a cylindrical sheath mounted coaxially in the top of the tower and reducing the operative cross-section, and having a height equal to the said distance, while the fans are mounted at the top of the tower; an existing tower can be changed into a tower according to the invention by mounting a cylindrical sheath of this type. In practice, the said distance will usually be equal at least to the vertical distance from the top of the tower to 85% of the operative height of the tower and at most to the vertical distance from the top of the tower to 50% of the operative height of the tower. The fans to be used may be of any suitable type in common use.

In the above examples the means for discharging the greater part of air from the tower consist of fans. In some cases it suffices to make use of the natural draught in the tower for discharging this part of the air, and fans are only provided for the smaller part of the air which has to pass through the purifying installation. In this case, the air discharge means are suitably arranged outlet openings. An embodiment of this kind is obtained e.g. by replacing the axial ventilators 12 in FIG. 3 by simple short stacks with raincaps.

The following table compares the operation of a known prilling tower according to FIG. 1 with the operation of a prilling tower according to FIG. 4. The table shows that for equal tower dimensions, equal processing conditions and essentially equal capital cost (all mechanical equipment and air purifying equipment included) the tower of the present invention produces prills at a substantial savings in energy consumption, even though a larger total air throughput is required.

|  | Known tower (FIG. 1) | Tower according to the invention (FIG. 4) |
| --- | --- | --- |
| Material treated | urea | urea |
| Amount processed (tons per day) | 1000 | 1000 |
| Diameter of tower (m) | 15.5 | 15.5 |
| Diameter of cylindrical sheath (13) (m) | not applicable | 13 |
| Height of cylindrical sheath (13) (m) | not applicable | 12.5 |
| Operative height (m) | 38 | 38 |
| Total amount of air sucked in through openings (5) (m³/hour N.T.P.) | 390,000 | 600,000 |
| Amount of air sucked off by high-pressure fans (6 and 9) with a suction capacity of about 15 m bars and discharged through purifying installation (7) (m³/hour N.T.P.) | 390,000 | 175,000 |
| Amount of air sucked off by low-pressure fans (14) with a suction capacity of about 2 m bars (m³/hour N.T.P.) | not applicable | 425,000*) |
| Temperature of air at point A (FIGS. 1 and 4) (°C) | 30 | 30 |
| Temperature of air at point B (FIG. 1) (°C) | 61 | not applicable |
| Temperature of air at point C (FIG. 4) (°C) | not applicable | 43 |
| Temperature of air at point D (FIG. 4) (°C) | not applicable | 43 |
| Temperature of air at point E (FIG. 4) (°C) | not applicable | 83 |
| Temperature of granules discharged at (3) (°C) | 70 | 70 |
| Total electric energy consumption (kw) | 300 | 185 |

*)This air current contained less than 10 mg of dust per m³.

We claim:
1. In a process for preparing solid granules from molten material which includes
    a. spraying drops of said molten material vertically downwardly from the upper end of a vertical tower through which a gas current flows upwardly.
    b. introducing said gas into the bottom of said tower to cool and solidify at least the outside of the drops while the same fall through an upper section of said tower, and further cool said drops to form solid granules during their fall below said upper section, and
    c. discharging said granules from the bottom of said tower,
    the improvement comprising:
    d. passing only a portion of said introduced gas through said upper section of said tower,
    e. passing said portion of gas from said upper section to a contamination-removal zone, and
    f. discharging the remainder of said introduced gas from said tower before said remainder enters said upper section.

2. A process as in claim 1 wherein the amount of gas passing through said upper section of said tower is between 20% and 50% of the total of said introduced gas.

3. A process as in claim 2 wherein said remainder of said gas is discharged from said tower after having passed through 50% to 85% of the height of said tower.

4. In a process for preparing solid granules from molten material which includes
    a. spraying drops of said molten material vertically downwardly from the upper end of a vertical tower through which a gas current flows upwardly,
    b. introducing said gas into the bottom of said tower to cool and solidify at least the outside of the drops while the same fall through an upper section of said tower and further cooling said drops to form solid granules during their fall below said upper section, and c. discharging said granules from the bottom of said tower, the improvement comprising:

d. discharging part of said introduced gas from said tower at a location below said upper section of said tower, e. discharging the remainder of said introduced gas at said upper end of said tower, f. removing contaminations from said remainder of said gas, and g. discharging the resulting contamination-free remainder to the atmosphere.

* * * * *

Disclaimer

3,975,472.—*Mathijs W. Packbier* and *Kees Jonckers*, Sittard, Netherlands. PROCESS AND DEVICE FOR PREPARING PRILLS. Patent dated Aug. 17, 1976. Disclaimer filed Dec. 28, 1977, by the assignee, *Stamicarbon B.V.*

Hereby enters this disclaimer to the entire term of said patent.

[*Official Gazette March 21, 1978.*]